United States Patent
Morliere et al.

(10) Patent No.: US 11,286,803 B2
(45) Date of Patent: Mar. 29, 2022

(54) COOLING DEVICE FOR A TURBINE OF A TURBOMACHINE

(71) Applicant: SAFRAN AIRCRAFT ENGINES, Paris (FR)

(72) Inventors: Simon Nicolas Morliere, Moissy-Cramayel (FR); Julian Nicolas Girardeau, Moissy-Cramayel (FR); Sébastien Jean Laurent Prestel, Moissy-Cramayel (FR); Ghislain Hervé Abadie, Moissy-Cramayel (FR); Benjamin Franklin François Gillot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/046,724

(22) PCT Filed: Mar. 28, 2019

(86) PCT No.: PCT/FR2019/050715
§ 371 (c)(1),
(2) Date: Oct. 9, 2020

(87) PCT Pub. No.: WO2019/197743
PCT Pub. Date: Oct. 17, 2019

(65) Prior Publication Data
US 2021/0164361 A1    Jun. 3, 2021

(30) Foreign Application Priority Data
Apr. 9, 2018 (FR) ...................................... 1853059

(51) Int. Cl.
*F01D 11/24* (2006.01)
*F01D 25/12* (2006.01)

(52) U.S. Cl.
CPC .............. *F01D 11/24* (2013.01); *F01D 25/12* (2013.01); *F05D 2220/323* (2013.01)

(58) Field of Classification Search
CPC .......... F01D 11/24; F01D 25/12; F01D 25/24; F02C 7/32; F05D 2220/323; F05D 2260/30; Y02T 50/60
See application file for complete search history.

(56) References Cited

U.S. PATENT DOCUMENTS

| | | | | |
|---|---|---|---|---|
| 4,312,185 A | * | 1/1982 | Nash | F23C 5/00 60/739 |
| 4,859,142 A | * | 8/1989 | Burke | F01D 11/24 415/116 |

(Continued)

FOREIGN PATENT DOCUMENTS

| | | |
|---|---|---|
| FR | 2995022 A1 | 3/2014 |
| FR | 3040428 A1 | 3/2017 |
| FR | 3054000 A1 | 1/2018 |

OTHER PUBLICATIONS

International Patent Application No. PCT/FR2019/050715, International Search Report and Written Opinion dated May 23, 2019, 14 pgs.

*Primary Examiner* — Igor Kershteyn
(74) *Attorney, Agent, or Firm* — Lathrop GPM LLP

(57) ABSTRACT

The invention relates to a cooling device (21) extending circumferentially around a turbine engine casing (1), such as, for example, a turbine casing (7), comprising a support (24) extending axially and intended to be attached to the casing (18), at least one cooling tube (23) extending circumferentially, at least one attachment member (25) comprising a radially inner portion (36) at least partially surrounding the tube (23), and a radially outer portion (37) attached to the support (24), the radially outer portion (37) of the attachment member (25) being attached to the support (Continued)

(24) through connecting means (30) formed by L-shaped sheets.

20 Claims, 4 Drawing Sheets

(56) References Cited

U.S. PATENT DOCUMENTS

| | | | | |
|---|---|---|---|---|
| 5,100,291 | A * | 3/1992 | Glover | F01D 11/24 165/169 |
| 5,399,066 | A * | 3/1995 | Ritchie | F01D 11/24 165/47 |
| 7,309,209 | B2 * | 12/2007 | Amiot | F01D 11/24 415/136 |
| 9,869,196 | B2 * | 1/2018 | Day | F01D 11/24 |
| 2002/0053837 | A1 * | 5/2002 | Arilla | F01D 25/12 310/58 |
| 2013/0028705 | A1 * | 1/2013 | Lagueux | F01D 11/24 415/1 |

* cited by examiner

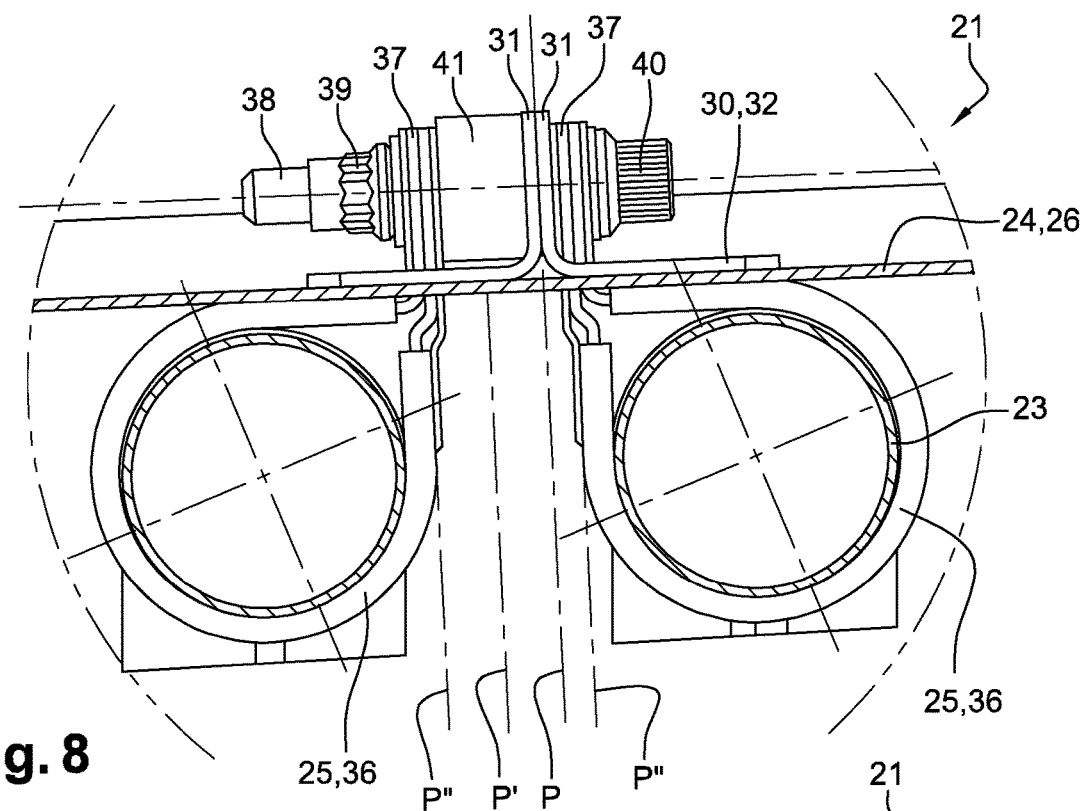
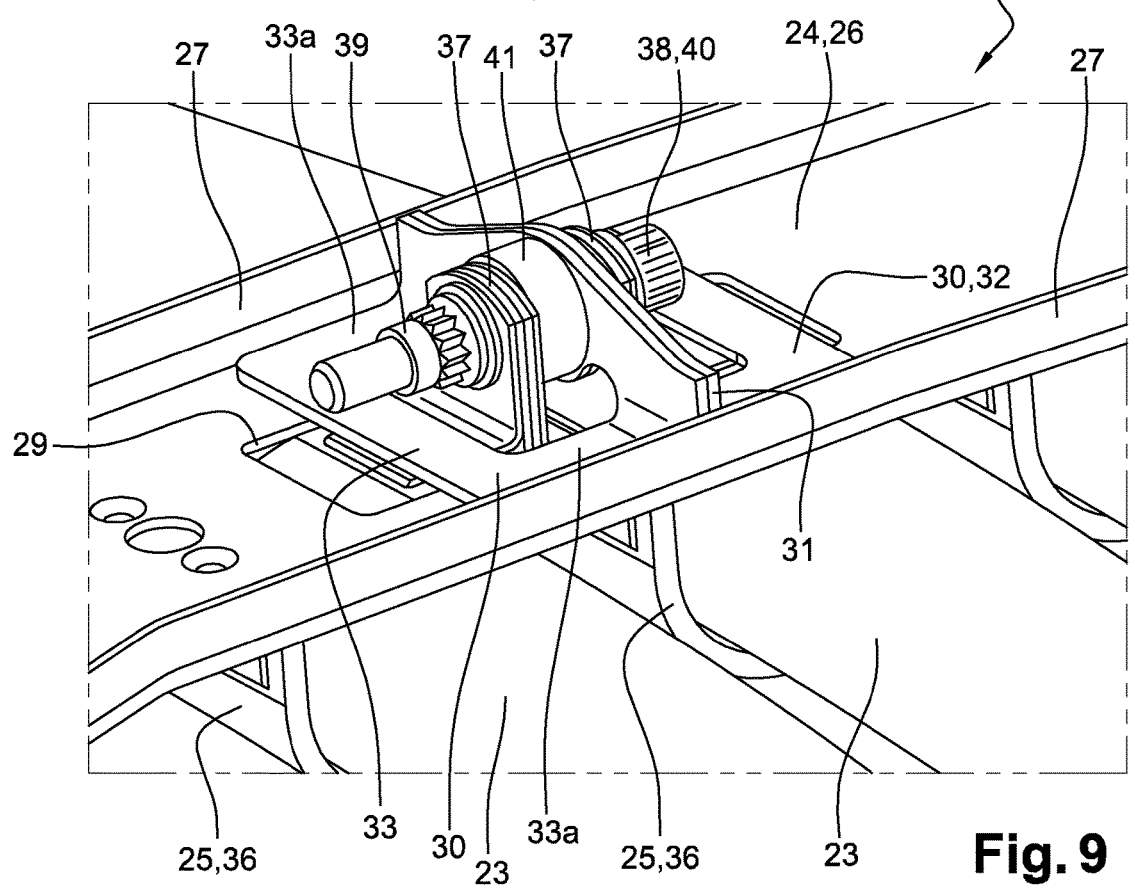

COOLING DEVICE FOR A TURBINE OF A TURBOMACHINE

CROSS-REFERENCE TO RELATED APPLICATIONS

This application is a 35 U.S.C. § 371 filing of International Application No. PCT/FR2019/050715 filed Mar. 28, 2019, which claims the benefit of priority to French Patent Application No. 1853059 filed Apr. 9, 2018, each of which is incorporated herein by reference in its entirety.

FIELD OF THE INVENTION

This invention concerns a cooling device for a turbine of a turbo machine, such as an aircraft turbojet, in particular a dual-flow turbojet.

BACKGROUND OF THE INVENTION

FIG. 1 shows a turbomachine 1 with double flow and double spool. The axis of the turbomachine is referenced X and corresponds to the axis of rotation of the rotating parts. In the following, the terms axial and radial are defined in relation to the X axis.

Turbomachine 1 has, from upstream to downstream in the direction of gas flow, a blower 2, a low-pressure compressor 3, a high-pressure compressor 4, a combustion chamber 5, a high-pressure turbine 6 and a low-pressure turbine 7.

The air from fan 2 is divided into a primary flow 8 flowing into a primary annular vein 9, and a secondary flow 10 flowing into a secondary annular vein 11 surrounding the primary annular vein 10.

The low-pressure compressor 3, high-pressure compressor 4, combustion chamber 5, high-pressure turbine 6 and low-pressure turbine 7 are located in primary vein 9.

The rotor of the high pressure turbine 6 and the rotor of the high pressure compressor 4 are coupled in rotation via a first shaft 12 in order to form a high pressure body.

The rotor of the low-pressure turbine 7 and the rotor of the low-pressure compressor 3 are coupled in rotation via a second shaft 13 in order to form a low-pressure body, the blower 2 being able to be connected directly to the rotor of the low-pressure compressor 3 or via an epicyclic gear train for example.

As is best seen in FIG. 2, the low-pressure turbine 7 has in particular different successive stages with moving wheels 14 and fixed parts. The impeller has a disc 15 on which blades 16 are mounted. The ends of the blades 16 are surrounded by a fixed ring 17 made of abradable material, said ring 17 being fixed on the turbine casing 18. Valves 19 are located downstream of the impellers 14. Valves 19 and rings 17 are mounted on the casing by means of flanges or hooks 20 extending from the radially inner surface of the casing 18.

In order to guarantee a high efficiency of the turbo machine, the air flow not passing through the impellers of the individual stages must be limited, i.e. leaks between the radially outer ends of the blades 16 and the ring 17 made of abradable material must be limited. To do this, the clearance must be checked at this interface, as this clearance is highly dependent on the temperature of casing 18, and in particular on the areas of said casing 18 containing the hooks or flanges 20 supporting ring 17.

The primary air flow from combustion chamber 5 is very hot and heats the downstream parts, such as the fixed and mobile parts of the turbine 6, 7.

In order to control the above-mentioned clearance and to avoid any premature degradation of the various stationary and mobile parts of the turbine, it is necessary to provide effective cooling means that can be easily integrated into the environment of the turbomachine.

The patent application FR 3 021 700, on behalf of the Applicant, discloses a cooling device 21 of a low-pressure turbine 7 casing 18, visible in FIG. 3, with collector boxes 22, each collector box 22 forming an axially extending channel.

The device 21 also includes tubes 23 extending circumferentially on either side of the collector boxes 22. These tubes 23, also called ramps, are formed by curved pipes of circular cross-section, each tube 23 extending circumferentially around the casing, for example at an angle of about 90°.

Each tube 23 has an air inlet opening into the channel of the corresponding collector box 22 and a closed distal end. Each tube 23 also has a cylindrical wall with air ejection openings facing casing 18, so that cooling air can enter the manifolds 22 and then the tubes 23 before opening through the openings facing casing 18 to cool it. This is known as impact cooling because the air impacts the casing 18.

All tubes 23 are held together on the casing 18 by means of supports 24 extending in the axis of the turbomachine, and thanks to hooks or fastening devices 25 located at different points on the circumference of the casing 18.

Document EN 3 002 590, on behalf of the applicant, discloses an embodiment in which the fastening devices comprise a radially inner part at least partially surrounding the corresponding tube and a radially outer part extending radially, fixed to a fastening tab of the support. Said fixing tab is made by cutting and bending a part of the support. Circular holes are provided in said tongue and in the corresponding fastening device, said holes allowing the passage of a fastening screw cooperating with a nut.

It has been found that it is difficult to control the exact position of the tabs after bending, making it difficult to control the radial and axial position of the hooks and thus the ramps used for cooling the relevant areas of the casing, which affects the cooling efficiency. In addition, it is possible that the radially inner parts of the tubes may come into contact with the outer surface of the casing due to the thermal, mechanical and vibratory stresses applied during operation. The force exerted by the casing on the tubes is transmitted to the tabs via the fastening devices, which can result in irreversible plastic deformation of the tabs or even the fastening devices, making it impossible to position the tubes radially and axially correctly in relation to the casing at a later date.

SUMMARY OF THE INVENTION

The invention more particularly aims at providing a simple, efficient and cost-effective solution to these problems.

For this purpose, it provides a cooling device extending circumferentially around a turbomachine casing, such as a turbine casing, comprising:
  an axially extending support for attachment to the casing,
  at least one circumferentially extending cooling tube,
  at least one fastening device, comprising a radially inner part at least partially surrounding the tube, and a radially outer part fixed to the support, characterised in that the radially outer part of the fastening device is fixed to the support by means of connecting means, said connecting means comprising two connecting members, each connecting member comprising a radially extending portion and an axially extending portion, the radial portions of the connecting members facing each other and fixed to each other, the radially outer portion of the fixing member being fixed to said radial portions of the connecting members, the axial portions of the connecting members being fixed to the support and each extending in an opposite axial direction.

The two connecting members are thus arranged back to back in opposite directions. In particular, the connecting members can be oriented symmetrically to each other, with respect to a radial plane parallel to the radial parts of the connecting members. The two connecting members may have identical or similar structures. Such an arrangement strengthens the connecting means and prevents them from becoming plastically deformed if the tubes come into contact with the casing.

In addition, the use of connecting members separate from the support allows better control of the manufacture of the various elements as well as the dimensional chain enabling the tubes to be precisely positioned in relation to the casing, both axially and radially.

The radial parts of the connecting members may be in contact with each other. Conversely, a radial element may be inserted axially between said radial parts. The radial parts of the connecting members can be welded, riveted or screwed together. The axial parts of the connecting members can be welded, riveted or welded to the support. Preferably, the connecting members are welded to the support.

Each connecting member can be formed by a folded sheet.

Each connecting member can be formed by bending the sheet metal.

The support can be formed by a metal sheet. The support can be obtained by cutting, bending and/or stamping said sheet.

The radially outer part of the fixing device is attached to the connecting members by means of at least one axially extending screw or rivet.

Since the screw does not extend in the radial direction, it is possible to increase the diameter of the corresponding tube and the radially inner part of the fixing device surrounding the tube without these elements interfering with the screw.

The radial portions of the connecting members may have radially extending elongated holes, said screw or rivet being engaged in said elongated holes.

This allows the fixing devices and tubes to move radially in relation to the support and connecting members. In other words, it is possible to control the radial position of the tubes in relation to the casing, before screwing or riveting, which makes it possible to effectively control the cooling of the casing.

The device may comprise at least two tubes extending circumferentially and axially spaced apart, each tube being attached to the support by means of a fastening device, the radially outer parts of the fastening devices being attached to the radial parts of the connecting members.

In such a case, the fastening devices for fastening the two adjacent tubes may be arranged symmetrically, one with respect to the other, with respect to a radial plane extending between said fastening devices.

This arrangement reduces the axial space requirement for these elements.

Each fixing device may have a substantially circular portion surrounding the tube, and a fastening portion extending radially outwardly from the circular portion and forming a fastening lug. The circular part is then radially inner while the fastening lug is radially outer.

The support may have at least one lumen located radially opposite the radially inner part of the fixing member or members, the axial part of at least one connecting member having a central part extending opposite the lumen.

In this way, in the case where the casing comes to rest on the tubes or on the internal parts of the fastening devices, the central part is able to limit the displacement of the internal part of the corresponding fastening device, so as to control the deformation of the radial parts of the connecting members and of the fastening device, in order to avoid plastic deformation of said radial parts.

Each lumen in the holder may be oblong in shape and extend axially. Each lumen of the support can have a general rectangular shape.

In particular, the axial part of each connecting member may have a central part. Each central part may cooperate with the inner part of a fixing device. Such an arrangement is particularly suitable in cases where the tubes are fixed in pairs to the connecting means.

Each connecting member may be generally U-shaped with the central part, intended to form the base of the U, from which two end branches extend, each extending axially on an opposite side of the lumen.

An axially extending spacer can be mounted between the radially outer part of at least one fixing device and the connecting means. Each spacer can be tubular.

The length of the spacer can be selected to control the axial position of the tubes in relation to the casing. The use of spacers also makes it possible to use standard components, as the axial positioning corrections of the tubes in relation to the casing can be achieved individually by using spacers of different sizes.

The support may have a main wall extending axially, with flanges extending radially outward from the side edges of the main wall.

Such a structure makes it possible to improve the dynamic behaviour of the support during the operation of the turbomachine by making it less sensitive to vibrations.

At least the axial parts of the connecting members may be located circumferentially between the flanges.

The invention also relates to an assembly comprising an annular casing of a turbomachine, for example an annular turbine casing, characterised in that it comprises a cooling device of the aforementioned type, fixed to said casing and surrounding said casing.

The invention also relates to a turbomachine comprising an assembly of the aforementioned type.

The invention will be better understood and other details, characteristics and advantages of the invention will appear when reading the following description, which is given as a non-limiting example, with reference to the attached drawings.

BRIEF DESCRIPTION OF THE FIGURES

FIG. 8 is a detailed view of FIG. 5;

FIG. 9 is a detailed view of FIG. 3;

DETAILED DESCRIPTION

FIGS. 4 to 9 illustrate a part of a cooling device 21 designed to be mounted on a low-pressure turbine 7 casing 18 of an aircraft turbomachine 1, according to an embodiment of the invention.

Figure 1:
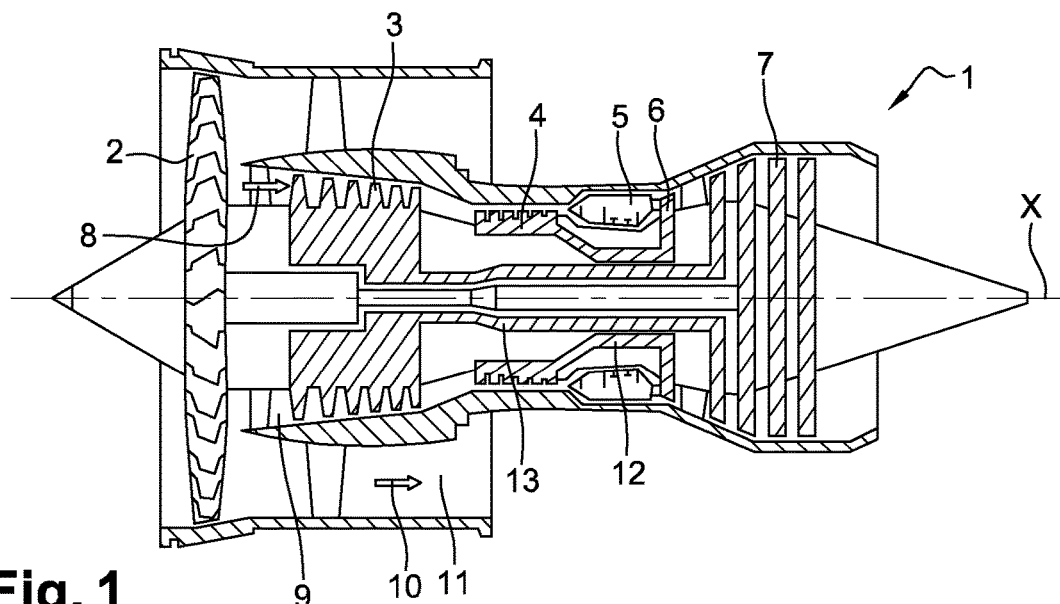
FIG. 1 is an axial cross-sectional view of a double-flow turbojet engine of the prior art.
Figure 2:
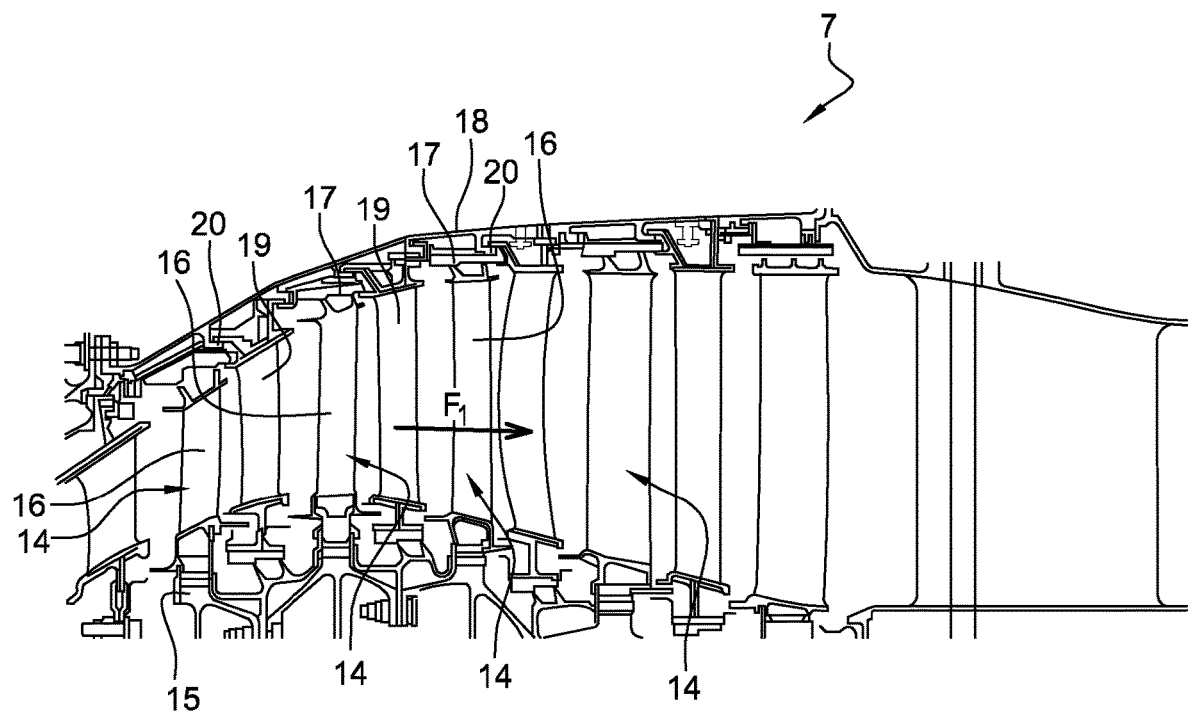
FIG. 2 is an axial cross-sectional view of a part of the turbojet engine of the prior art, illustrating in particular the low-pressure turbine.
Figure 3:
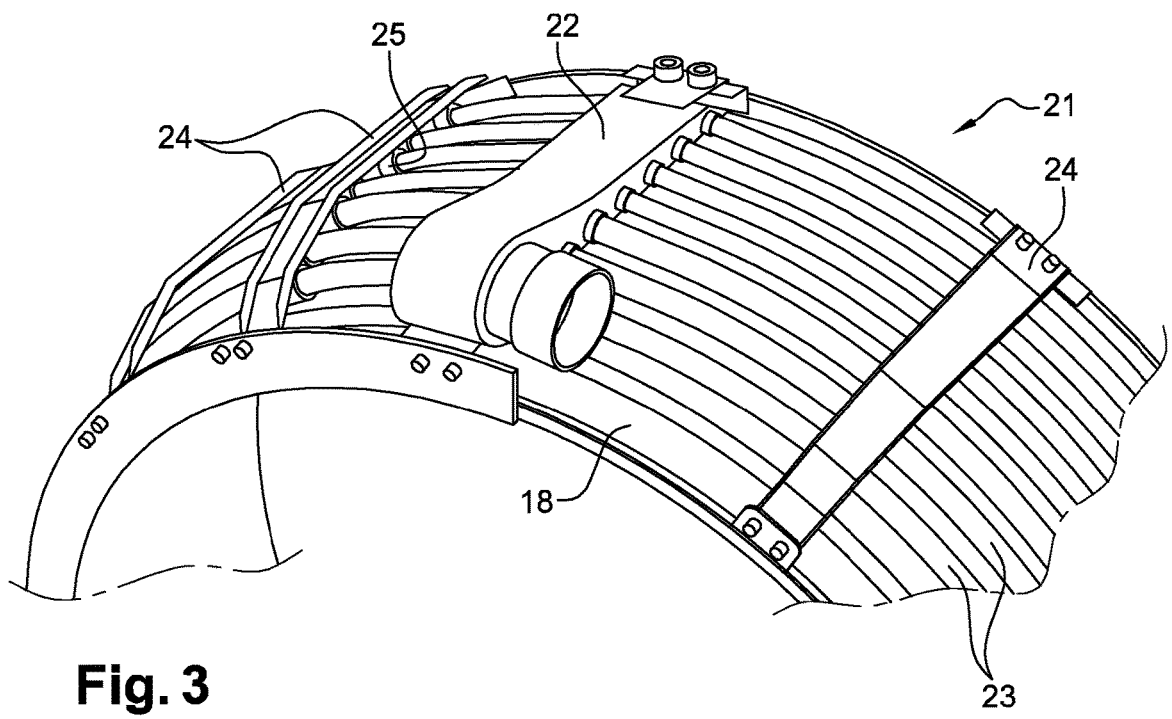
FIG. 3 is a perspective view of a cooling device of the prior art.
Figure 4:
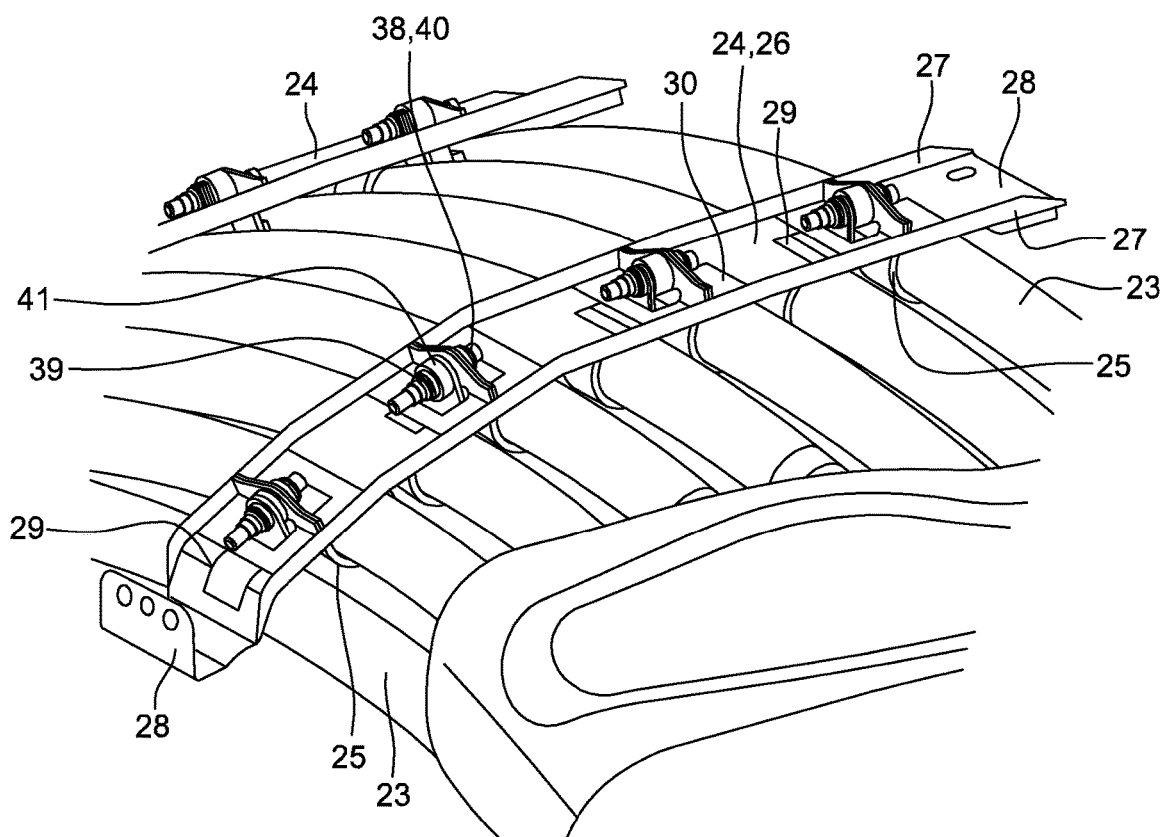
FIG. 4 is a perspective view of a part of a cooling device according to an embodiment of the invention.
Figure 5:
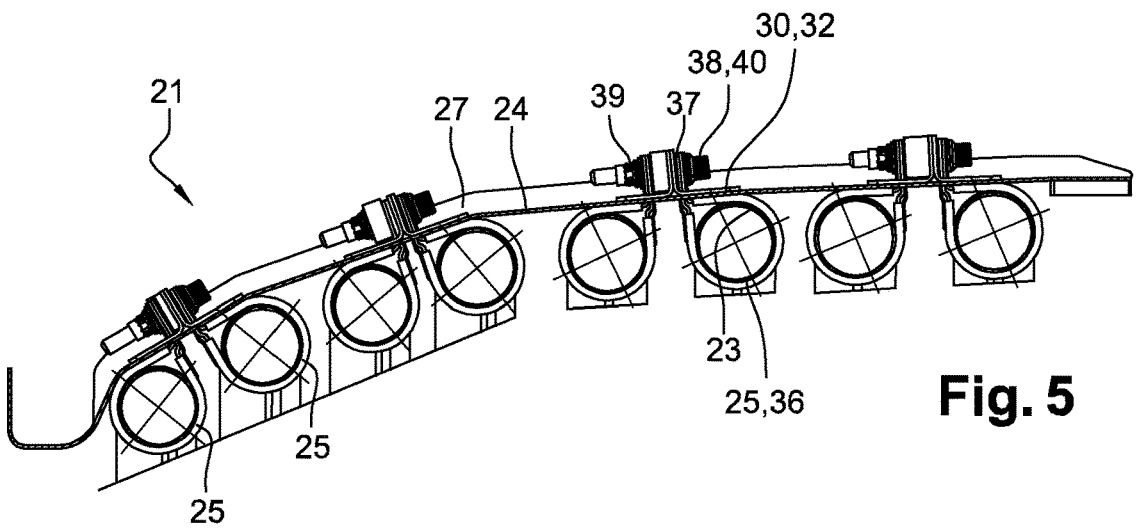
FIG. 5 is a cross-sectional view of a part of the cooling device according to the invention.
Figure 6:
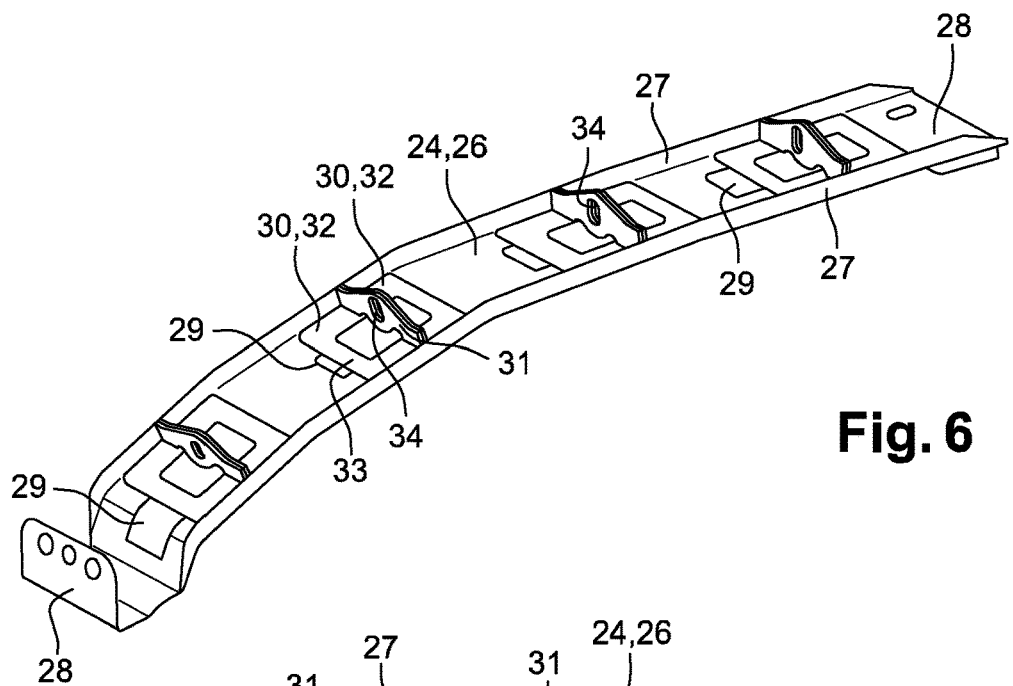
FIG. 6 is a perspective view of the support and of the connecting means.
Figure 7:
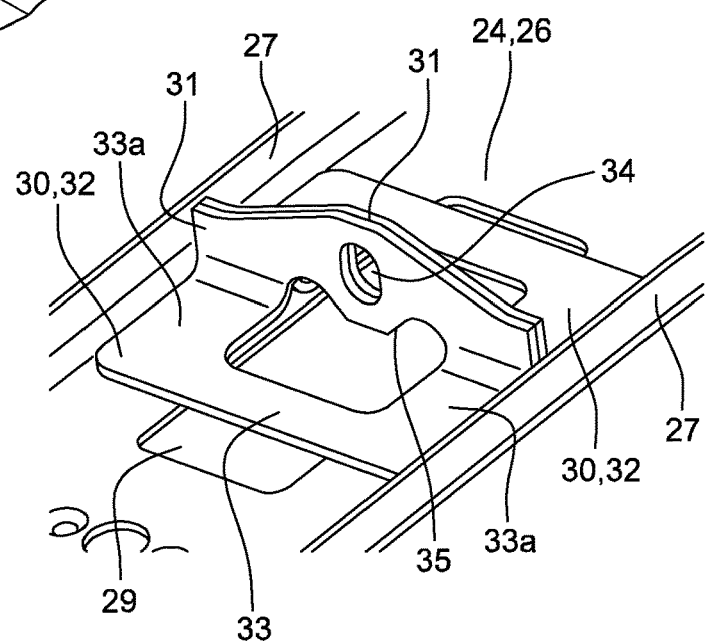
FIG. 7 is a detailed view of FIG. 6.

Cooling device 1 has a support 24, whose structure is best seen in FIG. 6. The support 24 is formed by cutting, folding and/or stamping a sheet metal and has an axially extending main wall 26, with flanges 27 extending radially outwards from the side edges of the main wall 26. The axial ends of the main wall 26 have fastening areas 28 for fixing to casing flanges.

Note that the fastening areas 28 may extend radially and/or axially. In the embodiment shown in the figures, one of the fastening areas 28 extending radially, the other fastening area 28 extending axially.

The main wall 26 has lumens 29 generally rectangular in shape, here four lumens 29 evenly distributed on the main wall. Lumens 29 extend along the axis of support 24.

Cooling device 1 also has connecting means comprising connecting members formed by sheet plates 30, in this case four pairs of sheet plates 30. Each sheet plate 30 has a radially extending part 31 and an axially extending part 32. The radial parts 31 of the sheet plates 30 are located opposite each other, resting against each other and welded together. The axial parts 32 of the sheet plates 30 are parallel to the main wall 26 and are welded to the main wall 26.

The axial part 32 of each plate 30 has a general U-shape with a central part, from which extend two branches 34 with first ends connected to the central part 33 and second ends connected to the corresponding radial part 31. Each central part is located opposite a lumen 29 on the main wall 26. Two sheet plates 30 are thus mounted opposite each other at each lumen 29 of the support 24.

The radial parts 31 of the sheet plates 30 have radially extending oblong holes 34. The radially inner edge 35 of each radial part 31 has a general M-shape, rounded, following in particular the contour of the lower part of the oblong hole 34. Such a shape makes it possible to limit the quantity of material, and therefore the weight, while guaranteeing sufficient mechanical strength.

The two sheet plates 30 are thus arranged side by side, symmetrically to each other, with respect to a radial plane P parallel to the radial parts of the sheet plates 30 (FIG. 8). The two sheet plates 30 have identical structures. The sheet plates 30 are obtained by cutting and folding.

Cooling device 1 also has fixing devices 36, here four pairs of fixing devices 25. Each fixing device 25 comprises a radially inner part 36, circular in shape, at least partially surrounding the corresponding tube 23, and a radially outer part 37 forming a radially extending fastening lug 37.

In the embodiment shown in the figures, each fixing device 25 is obtained by bending a sheet metal plate, the fastening lug 37 is then formed by the two ends of the sheet metal, which are plated one on top of the other. This makes it easier to insert the tubes 23 into the inner part 36 of the fixing devices 25. In the remainder of the description, these two ends are considered to form a single element, i.e. fastening lug 37. Of course, any other embodiment of the fixing devices 25 can be considered.

A hole is made in fastening lug 37, the hole being for example circular.

The fixing devices 25 of a pair are arranged symmetrically next to each other. In particular, the fixing devices 25 can be oriented symmetrically to each other, with respect to a radial plane P' parallel to the external parts 37 of the fixing devices (FIG. 8). The two fixing devices 25 can have identical structures, which limits the number of part numbers and assembly errors.

The radially outer parts 37 of the fixing devices 25 of the same pair are attached to the radial parts 31 of the sheet plates 30, axially on either side of the radial parts 31 of the sheet plates 30. Note that the inner part 36 of each fixing device 25 extends axially on only one side of the radial plane P''' defined by the corresponding outer part 37 (FIG. 8). The inner diameter of the inner part 36 of each fixing device 25 corresponds approximately to the outer diameter of the corresponding tube 23.

The external parts or lugs 37 are fixed to the radial parts 31 of the corresponding sheet plates 30 by means of a screw 38 and a nut 39. Screw 38 extends axially through the holes in the lugs and the oblong holes in the sheet plates 30. The head 40 of the screw 38 is supported on the lug 37 of one of the fixing devices 25 of a pair, the nut 39 is supported on the lug 37 of the other fixing device 25 of said pair.

This makes it possible to control the radial position of the fastening devices 25 and tubes 23 in relation to the support 24 and the connecting members 30. In other words, it is possible to control the radial position of the tubes 23 in relation to the casing 18, before screwing or riveting, by radial displacement of screw 38 in the oblong holes 34.

An axially extending spacer 41 may be provided between at least one of the lugs 37 and the radial part 31 of the corresponding sheet plate 30. Of course, a spacer 41 can be provided between each lug 37 and the radial part 31 of the corresponding sheet plate 30.

The length of the spacer 41 can be selected to control the axial position of the tubes 23 in relation to the casing 18.

If the casing 18 comes to rest on the tubes 23 or on the inner parts 36 of the fixing devices 25, the radially inner parts 36 of the fixing devices 36 are able to come to rest on the stop parts 33 of the sheet plates 30 through the corresponding lumen 29. This limits the deformation of the fixing devices 25 so that no plastic deformation said elements can occur. It should be noted that the formation of lumens 29 in the main wall 26 allows to reduce the mass of the support 24.

The invention claimed is:

1. A cooling device extending circumferentially around a casing of a turbomachine, comprising:
   an axially extending support for attachment to the casing,
   at least one circumferentially extending cooling tube,
   at least one fastening device, comprising a radially inner part at least partially surrounding the tube, and a radially outer part fixed to the support, characterised in that the radially outer part of the fastening device is fixed to the support by means of connecting means, said connecting means comprising two connecting members, each connecting member comprising a radially extending portion and an axially extending portion, the radial portions of the connecting members facing each other and fixed to each other, the radially outer portion of the fixing member being fixed to said radial portions of the connecting members, the axial portions of the connecting members being fixed to the support and each extending in an opposite axial direction.

2. The cooling device according to claim 1, characterised in that each connecting member is formed by a folded sheet metal.

3. The cooling device according to claim 2, characterised in that the radially outer part of the fastening device is fastened to the connecting members by means of at least one axially extending screw or rivet.

4. The cooling device according to claim 2, characterised in that it comprises at least two tubes extending circumferentially and axially spaced apart, each tube being attached to the support by means of a fastening device, the radially outer parts of the fastening devices being attached to the radial parts of the connecting members.

5. The cooling device according to claim 2, characterised in that the support has at least one lumen situated radially opposite the radially inner part of the fixing member or members, the axial part of at least one connecting member having a central part extending opposite the lumen.

6. The cooling device according to claim 1, characterised in that the radially outer part of the fastening device is fastened to the connecting members by means of at least one axially extending screw or rivet.

7. The cooling device according to claim 6, characterised in that the radial portions of the connecting members have radially extending oblong holes, said screw or said rivet being engaged in said oblong holes.

8. The cooling device according to claim 7, characterised in that it comprises at least two tubes extending circumferentially and axially spaced apart, each tube being attached to the support by means of a fastening device, the radially outer parts of the fastening devices being attached to the radial parts of the connecting members.

9. The cooling device according to claim 7, characterised in that the support has at least one lumen situated radially opposite the radially inner part of the fixing member or members, the axial part of at least one connecting member having a central part extending opposite the lumen.

10. The cooling device according to claim 6, characterised in that it comprises at least two tubes extending circumferentially and axially spaced apart, each tube being attached to the support by means of a fastening device, the radially outer parts of the fastening devices being attached to the radial parts of the connecting members.

11. The cooling device according to claim 6, characterised in that the support has at least one lumen situated radially opposite the radially inner part of the fixing member or members, the axial part of at least one connecting member having a central part extending opposite the lumen.

12. The cooling device according to claim 1, characterised in that it comprises at least two tubes extending circumferentially and axially spaced apart, each tube being attached to the support by means of a fastening device, the radially outer parts of the fastening devices being attached to the radial parts of the connecting members.

13. The cooling device according to claim 12, characterised in that the support has at least one lumen situated radially opposite the radially inner part of the fixing member or members, the axial part of at least one connecting member having a central part extending opposite the lumen.

14. The cooling device according to claim 12, characterised in that the support has an axially extending main wall, flanges extending radially outwards from the side edges of the main wall.

15. The cooling device according to claim 1, characterised in that the support has at least one lumen situated radially opposite the radially inner part of the fixing member or members, the axial part of at least one connecting member having a central part extending opposite the lumen.

16. The cooling device according to claim 15, characterised in that the axial portion of each connecting member is generally U-shaped with the central part from which two end branches extend, each extending axially on an opposite side of the lumen.

17. The cooling device according to claim 15, characterised in that the support has an axially extending main wall, flanges extending radially outwards from the side edges of the main wall.

18. C The cooling ooling device according to claim 1, characterised in that an axially extending spacer is mounted between the radially outer part of at least one fastening device and the connecting means.

19. The cooling device according to claim 1, characterised in that the support has an axially extending main wall, flanges extending radially outwards from the side edges of the main wall.

20. An assembly comprising an annular casing of a turbomachine, characterised in that it comprises a cooling device according to claim 1, fixed to said casing and surrounding said casing.

* * * * *